United States Patent
Richards et al.

(10) Patent No.: US 6,215,282 B1
(45) Date of Patent: Apr. 10, 2001

(54) BATTERY CHARGING SYSTEM EMPLOYING MULTI-MODE LOW POWER FAST CHARGE PROCESS

(75) Inventors: Anthony M. Richards, San Diego; Charles E. Hardgrove, Imperial Beach, both of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/597,889

(22) Filed: Jun. 19, 2000

(51) Int. Cl.$^7$ .......................... H01M 10/44; H01M 10/46
(52) U.S. Cl. .............................................................. 320/160
(58) Field of Search ................................... 320/124, 125, 320/132, 134, 136, 155, 157, 160, 162, 164

(56) References Cited

U.S. PATENT DOCUMENTS 5,432,429 * 7/1995 Armstrong, II et al. .

OTHER PUBLICATIONS

Balough, Laszlo, "Implementing Multi–State Charge Algorithm with the UC3909 Switchmode Lead–Acid Battery Charger Controller", Unitrode Corporation, Texas Instruments Inc., 1999.
"Lead–Acid Fast–Charge IC", bq2031, Benchmarq Products, Texas Instruments Inc., Jun., 1999.
Fleming, Frank A. et al., "Rapid Recharge Capability of Valve Regulated Lead Acid Batteries for EV & HEV Applications", Hawker Energy Publication, 1999.
Jana, Kalyan, "Charging Pure Lead–Tin Batteries: A Guide for CYCLON and Genesis Products", Hawker Energy Publication, First Edition, pp. 8–14, Mar. 1999.
"U–510 Using the bq2031 to Charge Lead–Acid Batteries", Unitrode Corporation, Texas Instruments, Oct., 1997.

* cited by examiner

Primary Examiner—Edward H. Tso
(74) Attorney, Agent, or Firm—Phillip R. Wadsworth; Grgory D. Ogrod; Thomas M. Thibault

(57) ABSTRACT

An especially low power, fast completion battery charge process varies the voltage, current, and time of charging a battery according to the battery's state of charge. Initially, a battery charger apparatus applies a fast charge current to the battery. When the battery voltage increases to a target voltage, the battery charger applies a fast charge voltage to the battery. This continues until the current flowing through the battery decreases to a prescribed minimum current. The battery charger then calculates the elapsed time between the battery's initially receiving the fast charge current and later achieving the minimum current. Using the elapsed time, the charger computes a proposed overcharge time comprising a multiplicative product of the elapsed time and a temperature-dependent adjustment factor. Next, the battery charger applies an overcharge voltage to the battery for the proposed overcharge time, unless the proposed overcharge time exceeds a prescribed maximum time. In that event, the battery charger applies the overcharge voltage to the battery for the prescribed maximum time.

22 Claims, 6 Drawing Sheets

BATTERY CHARGING SYSTEM EMPLOYING MULTI-MODE LOW POWER FAST CHARGE PROCESS

BACKGROUND OF THE INVENTION

I. Field of the Invention

The present invention relates to techniques for applying charges to rechargeable batteries. More particularly, the invention concerns an especially low power, fast completion battery charge process that varies the charging voltage, current, and time according to the battery's state of charge.

II. Description of the Related Art

Along with increased computing power, portability has been an important hallmark of the electronic age. Some electronic products today are manufactured in handheld packages, where the same component in past years occupied an entire room. Such portability would be meaningless without the availability of similarly portable power supplies, so it is no surprise that batteries have also undergone significant development in storage capability, compactness, and other features.

Over the years, engineers have developed a number of different battery charging techniques. Although many of these techniques constitute significant advances, and some even enjoy widespread commercial use today, engineers at Qualcomm Inc. are nonetheless interested in improving the performance and efficiency of known battery charging processes. One area of possible focus concerns preventing premature battery decay and loss of battery capacity. For example, the inventors have recognized that certain discharge profiles, under some existing lead acid battery charging algorithms repeatedly undercharge their batteries, causing their batteries to suffer premature battery decay. Some other areas of possible focus include extending battery life, maximizing battery charge, and shortening charge time.

SUMMARY OF THE INVENTION

Broadly, the present invention concerns a battery charger that employs an especially low power, fast completion battery charge process that varies the voltage, current, and time of charging a battery according to the battery's state of charge. Initially, the charger applies a fast charge current to the battery. When the battery voltage increases to a target voltage, the battery charger applies a fast charge voltage to the battery. This continues until the current flowing through the battery decreases to a prescribed minimum current.

The battery charger then calculates the elapsed time between initially applying the fast charge current and the battery's later achieving minimum current. Using the elapsed time, the charger computes a proposed overcharge time comprising a multiplicative product of the elapsed time and a temperature-dependent adjustment factor. Next, the battery charger applies an overcharge voltage to the battery for the duration of the proposed overcharge time, not to exceed a prescribed maximum time. The charger may enter a float or trickle charge mode after completing the overcharge cycle.

The foregoing features may be implemented in a number of different forms. For example, the invention may be implemented to provide a method of charging a battery. In another embodiment, the invention may be implemented to provide an apparatus such as a battery charger. In still another embodiment, the invention may be implemented to provide a signal-bearing medium tangibly embodying a program of machine-readable instructions executable by a digital data processing apparatus to charge a battery as shown herein. Another embodiment concerns logic circuitry having multiple interconnected electrically conductive elements configured to perform battery charging as described herein.

The invention affords its users with a number of distinct advantages. Beneficially, the battery charging process of this invention utilizes a fast charge mode that achieves rapid charging of lead acid batteries. Also, by sensing battery source current, the invention provides a full charge over a wide temperature range, and avoids the premature loss of battery capacity that can result from repeatedly undercharging the battery. Also, the invention can help preserve the accuracy of battery source current measurements by temporarily decoupling the battery from its electrical load. The invention also provides a number of other advantages and benefits, which should be apparent from the following description of the invention.

DETAILED DESCRIPTION OF THE PREFERRED EMBODIMENTS

Figure 1A:
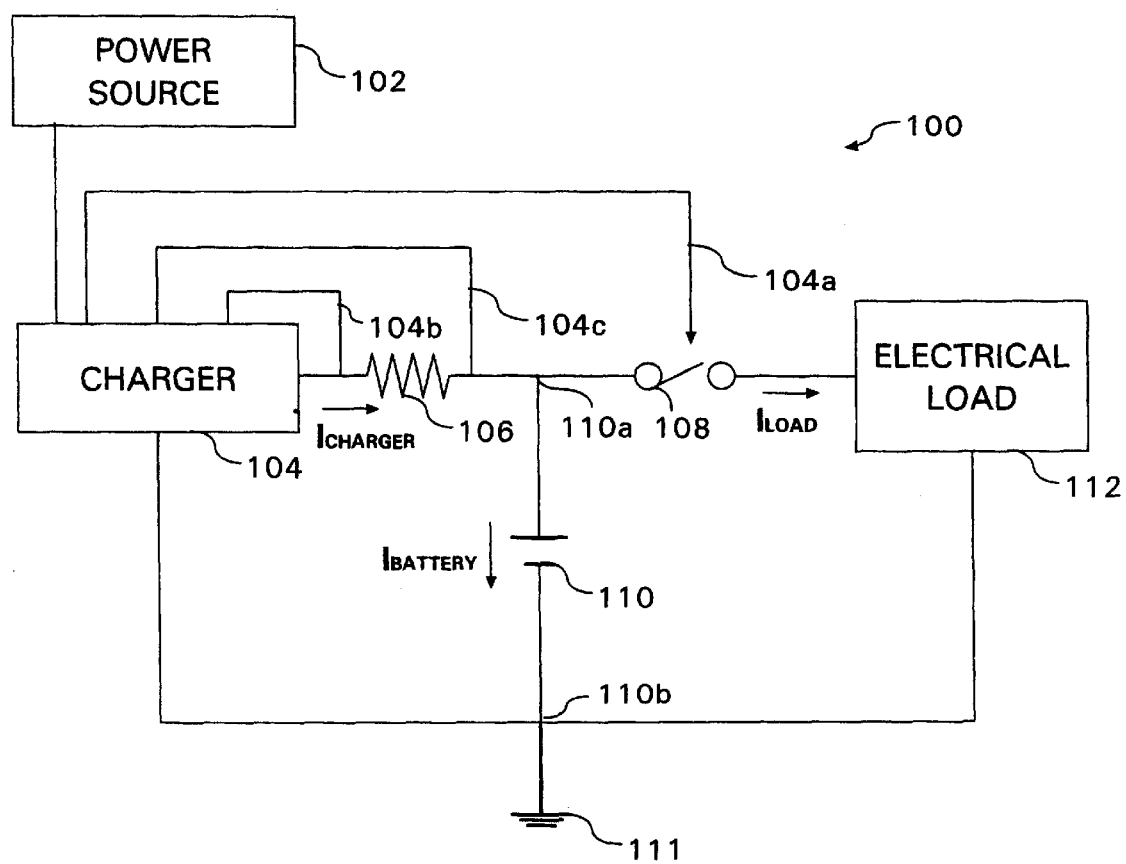
FIG. 1A is a block diagram of the hardware components and interconnections of a battery charging system according to this invention.

The nature, objectives, and advantages of the invention will become more apparent to those skilled in the art after considering the following detailed description in connection with the accompanying drawings.

HARDWARE COMPONENTS & INTERCONNECTIONS

Introduction

As mentioned above, this invention concerns an especially low power, fast completion battery charge process that varies the voltage, current, and time of charging a battery according to the battery's state of charge. Unlike previous battery charging techniques, this invention utilizes a fast charge mode (applying prescribed current then voltage to initially charge the battery), a voltage-driven overcharge mode to bring battery voltage to a target level, and then a trickle or float mode to maintain the battery for imminent use.

Battery Charging System

One aspect of the invention concerns a battery charger, which may be embodied by various hardware components and interconnections. One example is described in FIG. 1A by the battery charger 104, which is shown in the context of the charging system 100. In addition to the charger 104, the charging system 100 includes a power source 102, impedance 106, battery 110, load decoupling switch 108, and electrical load 112.

As explained below in greater detail, the charger 104 includes various subcomponents to selectively apply power from the power source 102 to the battery 110, in a manner that carefully manages the time, voltage, and current of such power application. The power source 102 comprises a source of electrical power appropriate to the particular make/model of battery 110, requirements of the load 112, portable or fixed location of the charger 104, and other considerations. For example, the power source 102 may comprise a one-hundred-ten volt electrical outlet, another battery such as a vehicle battery, an alternator or generator, a solar panel, etc. In the event the power source 102 provides power in alternating current form, the charger 104 includes conversion circuitry to provide a direct current output to the battery 110.

In addition to its coupling with the power source 102, the charger 104 is interconnected between positive 110*a* and negative 110*b* terminals of the battery 110, in order to supply a charge to the battery 110. If desired, the charger 104 may be coupled to the positive battery terminal 110*a* via an impedance component such as a current sense resistor 106 (as shown), in order to measure the charger current. The current measured by the current sense resistor 106 is the sum of the battery 110 charge current and the electrical load 112 current when a switch 108 (discussed below) is closed. It measures the battery charge current when switch 108 is open. The negative battery terminal 110*b* is coupled to an electrical ground or common node 111.

In addition to the charger 104, the battery 110 also lies in parallel with an electrical load 112. The electrical load 112 represents the electrical equipment being powered by the battery 110. Advantageously, a load decoupling switch 108 may be interposed between the battery 110 and the electrical load 112 to selectively decouple the electrical load 112 and the battery 110. As shown below, such decoupling enables more accurate measurement of the battery's charging current.

Although the switch 108 may be manually operated, a more automated embodiment of the invention utilizes a switch that is remotely actuated by the charger 104 at selected times. Although different implementations may be used without departing from this invention, one implementation of the switch 108 is a single pole, single throw switch. Remote actuation of the switch 108 may be effected by wire connection, fiber optics, wireless signals, or another coupling. One easily implemented example utilizes a switch 108 that electrically actuates in response to specific electrical signals received from the charger 104 over a conductive path, as exemplified by the connection 104*a*.

In addition to the connection 104*a*, the charger 104 may include connections 104*b*, 104*c* to electrically opposing sides of the impedance 106, for the purpose of sensing voltage across the impedance 106 (and ultimately computing current there through).

Charger Details

Figure 1B:
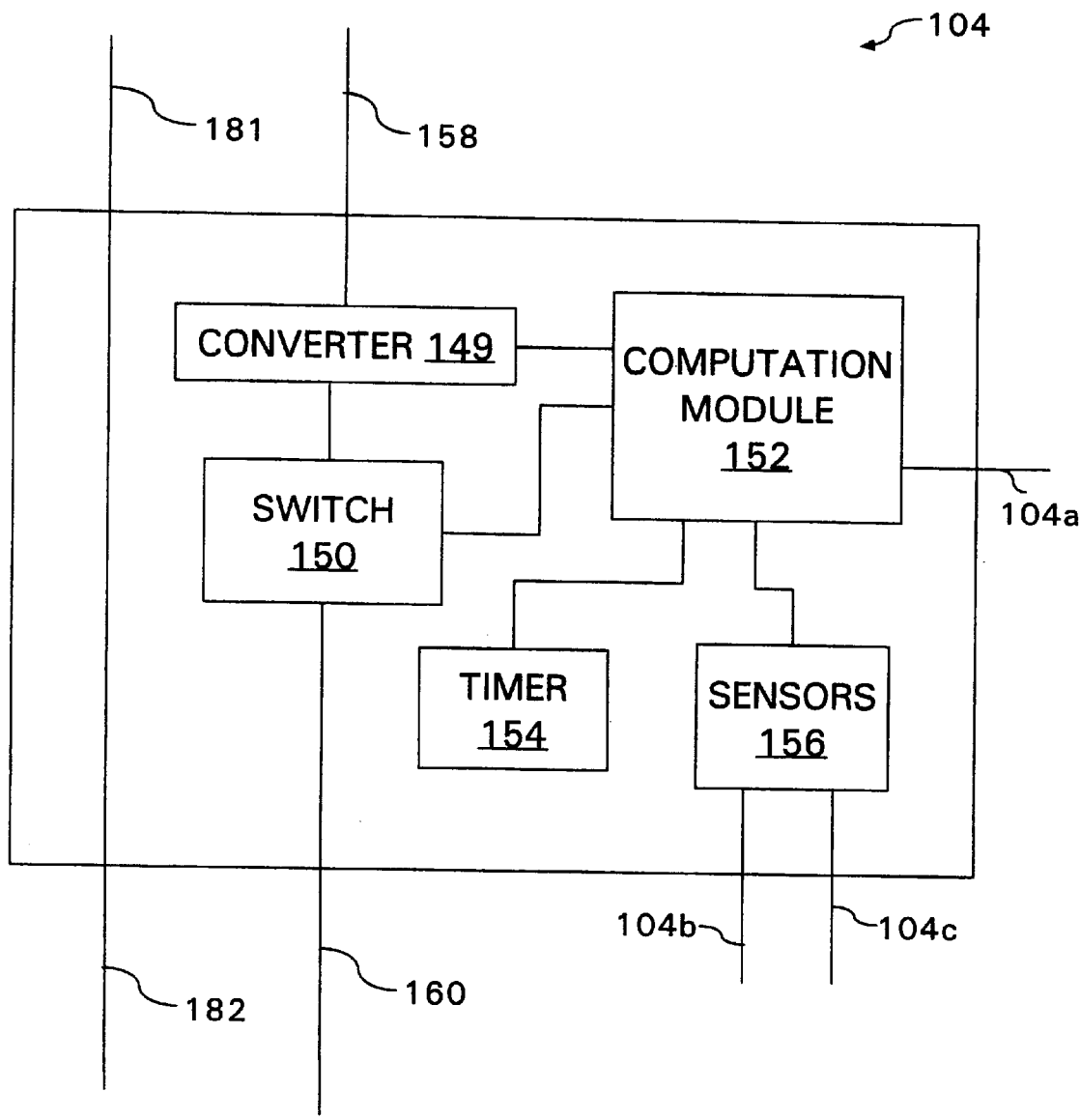
FIG. 1B is a more detailed block diagram of the charger component of FIG. 1A, according to the invention.

FIG. 1B shows the charger 104 in more detail. The charger 104 includes a converter 149, charging activation switch 150, computation module 152, timer 154, and one or more sensors 156. These components may be implemented using some or all of the following: discrete circuitry, application-specific integrated circuits (ASICs), microprocessors, logic circuitry, etc.

The converter 149 is controllable by the computation module 152 in order to convert from the power source 102 into suitable power for the battery 110. In one operational regime, the converter 149 converts alternating current electricity from the power source 102 into direct current voltage or current for use at the battery 110. In response to input from the computation module 152, the converter 149 may additionally change the magnitude of the output voltage or current, for example by reducing it. The foregoing functions may be implemented by a converter 149 that comprises a switching or linear regulator type of circuit, for example.

The converter 149 is coupled to the power source 102 by a line 158. The charger 104 may be coupled to the power source's electrical ground by a line 181; in this embodiment, the charger 104 provides a line 182 to couple this ground signal to the electrical ground 111 (FIG. 1A).

The charging activation switch 150 couples and decouples the converter 149 to the battery 110, thereby selectively charging the battery 110 with charging power. It is also used to isolate the charger from the battery in the event the input power source is removed. The switch 150 is coupled to the impedance 106 by the line 160. The switch 150 is operated under control of the computation module 152, which also performs other computational tasks as shown below. For example, the computation module 152 utilizes the timer 154 to measure times between various charging events, as shown below. The computation module 152 also analyzes various inputs from sensors 156, which measure the battery's charging voltage (voltage across the battery terminals 110*a*, 110*b*) via the lines 104*b*, 104*c*, for example. As an example, the sensors 156 may comprise analog-to-digital converter circuits.

Exemplary Digital Data Processing Apparatus

According to one embodiment of the invention, the computation module 152 may be implemented by a digital data processing apparatus. Although this apparatus may be embodied by various hardware components and interconnections, one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory (RAM), and may be used to store the programming instructions executed by the processor 202. The nonvolatile storage 208 may comprise, for example, one or more magnetic data storage disks such as a hard drive, a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided onboard the processor 202, or even provided externally to the apparatus 200.

Logic Circuitry

In contrast to the digital data storage apparatus discussed previously, a different embodiment of the invention uses logic circuitry instead of computer-executed instructions to implement the computation module 152. Depending upon the particular requirements of the application in the areas of speed, expense, tooling costs, and the like, this logic may be implemented by constructing an ASIC having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

OPERATION

In addition to the various hardware embodiments described above, a different aspect of the invention concerns a unique battery charging method. The invention uses an especially low power, fast completion battery charge process that varies the voltage, current, and time of charging a battery according to the battery's state of charge. Unlike previous battery charging techniques, this invention utilizes a fast charge mode (applying prescribed current then voltage to initially charge the battery), a voltage-driven overcharge mode to bring battery voltage to a target level, and then a trickle or float mode to maintain the battery for imminent use.

Signal-Bearing Media

Figure 2:
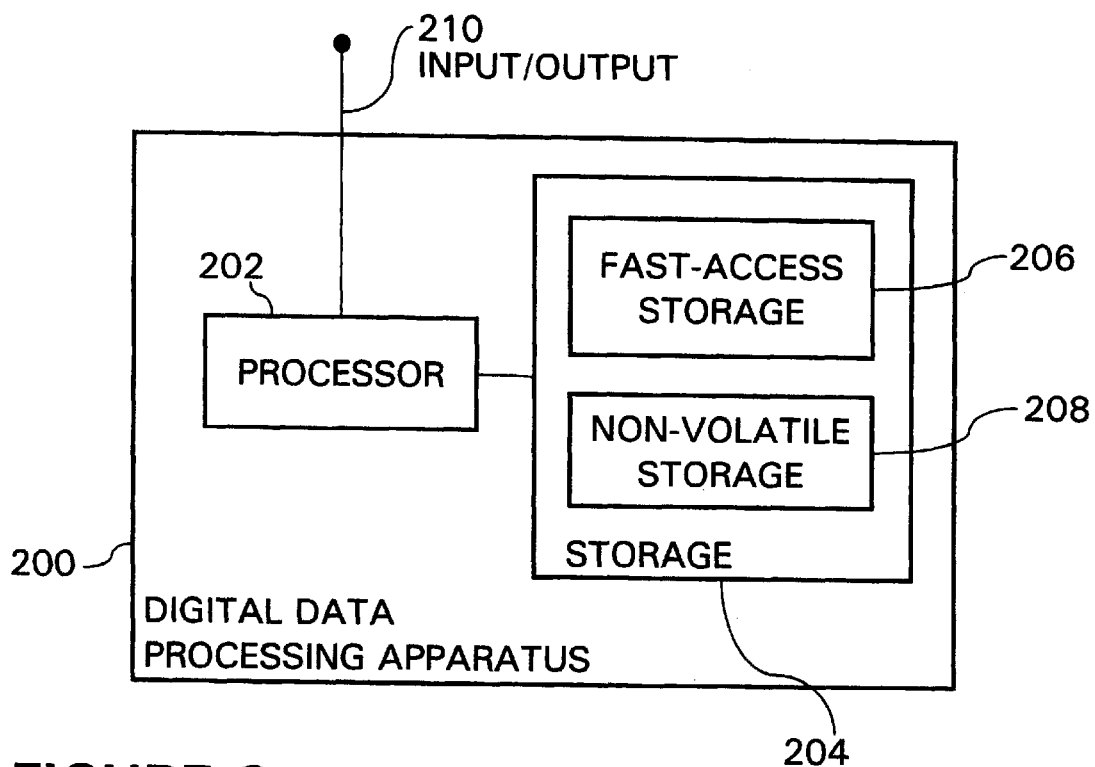
FIG. 2 is a block diagram of a digital data processing machine according to the invention.

In the context of FIGS. 1A–1B and 2, such a method may be implemented, for example, by operating the computation module 152 (as embodied by a digital data processing apparatus 200) to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform the battery charging technique described herein.

Figure 3:
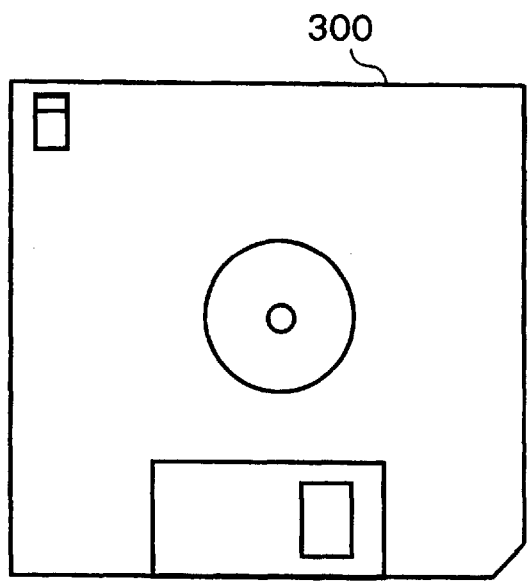
FIG. 3 shows an exemplary signal-bearing medium according to the invention.

This signal-bearing media may comprise, for example, RAM (not shown) contained within the computation module 152, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional hard drive, redundant array of inexpensive disks (RAID), or another direct access storage device (DASD), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as AC, etc.

Logic Circuitry

In contrast to the signal-bearing medium discussed above, the method aspect of the invention may be implemented using logic circuitry, without using a processor to execute instructions. In this embodiment, the logic circuitry is implemented in the computation module 152, and is configured to perform operations to implement the process of this invention, as described herein. The logic circuitry may be implemented using many different types of circuitry, as discussed above.

Operating Sequence

Introduction

Figure 4:
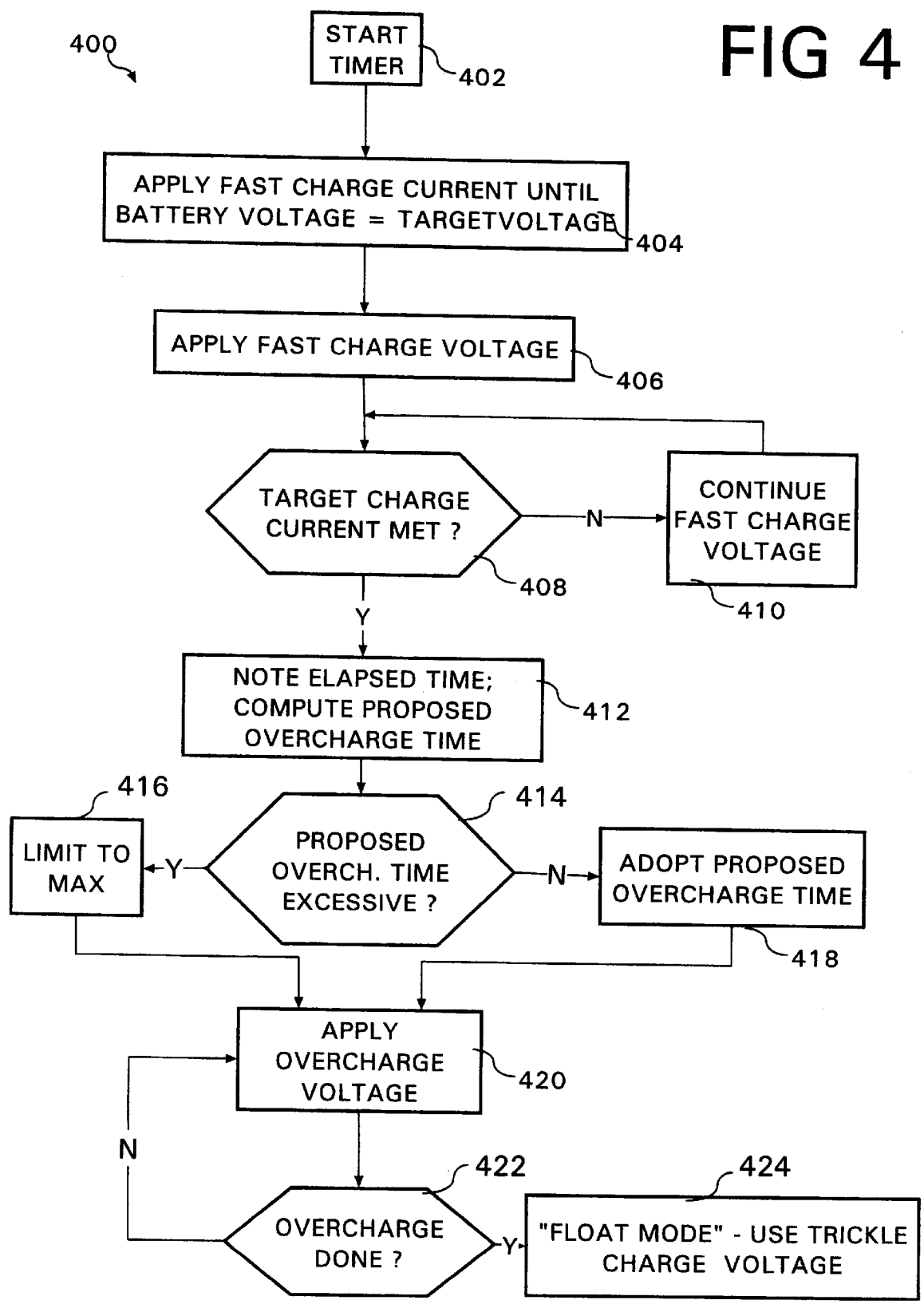
FIG. 4 is a flowchart showing a battery charging sequence according to this invention.

FIG. 4 shows a sequence 400 to illustrate one example of the method aspect of the present invention. For ease of explanation, but without any intended limitation, the example of FIG. 4 is described in the context of the hardware of FIGS. 1A–1B, as described above. FIG. 4 is described in the context of a battery 110 of lead acid type, rated at a voltage of 2.14 Volts per cell. An example of a suitable commercial embodiment of the example battery is a Hawker Energy Products, Inc. brand, E-Cell single type battery.

Fast Charge Mode

The sequence 400 begins in step 402. To best describe the operations 400, the battery is in a condition suitable for recharging, with a voltage of 1.95 Volts across the terminals 110a–110b when the electrical load 112 and charger 104 are disconnected. In step 402, the computation module 152 starts the timer 154. As explained below, the timer 154 is used to track the time required to perform steps 404, 406, 410 and ultimately receive an affirmative answer to step 408. This period is referred to as the fast charge mode.

After step 402, the module 152 operates the converter 149 and charging activation switch 150 to provide a prescribed, constant level fast charge current to the battery (step 404). The level of fast charge current is selected in order to minimize the power requirements of the charger while maintaining the maximum cyclic performance of the cell. The most appropriate fast charge current varies according to the make/model of battery, and this value may be determined empirically. In the present example, with a 2.14 Volt 8 Ah lead acid battery 110, a fast charge current of 3.2 Amps is utilized in step 404. The current applied in step 404 is also referred to as $I_{limit}$. Step 404 continues until the computation module 152 determines, via one or more of the sensors 156, that the voltage across the battery terminals 110a, 110b has risen to a prescribed target voltage, which in this example is 2.5 Volts. The particular value of the target voltage is selected to ensure the desired cyclic performance is achieved. Selecting too low of a voltage will lead to rapid loss of battery capacity. The target voltage may, for example, be defined by the manufacturer for a given make/model of battery.

Figure 5:
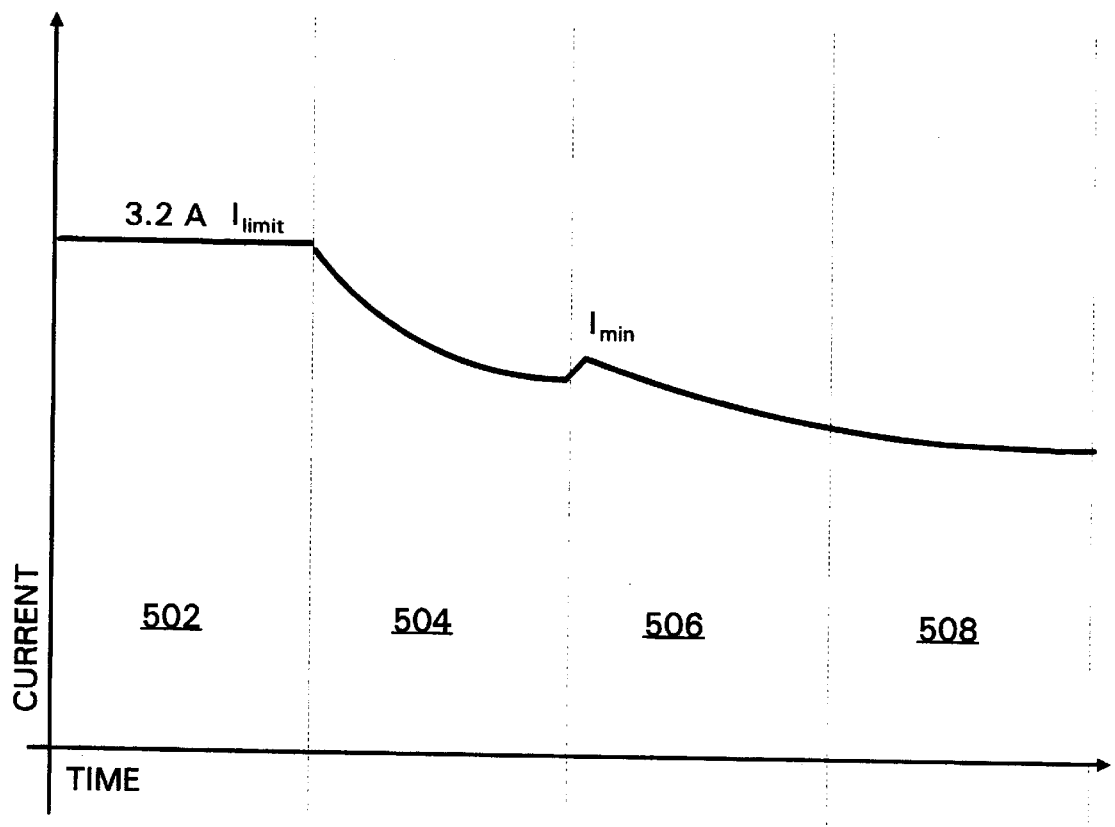
FIG. 5 is a graphical plot showing battery current versus time, during charging according to the invention.
Figure 6:
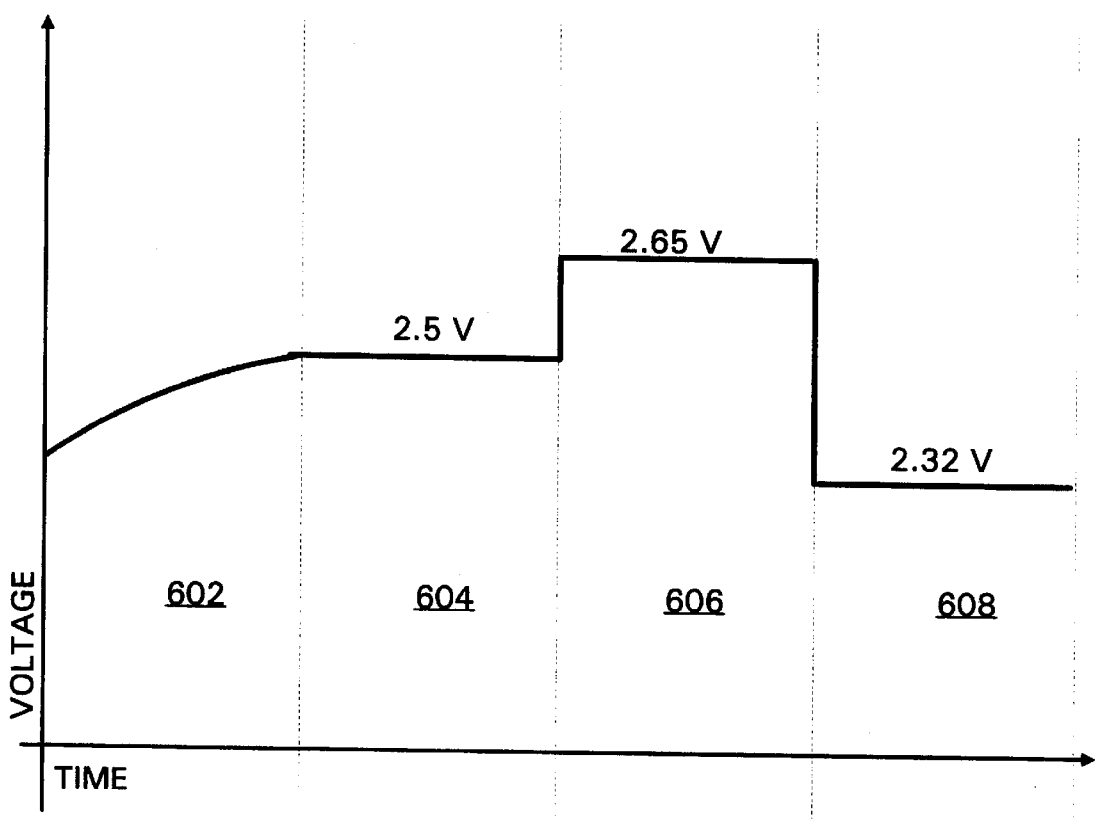
FIG. 6 is a graphical plot showing battery voltage versus time, during charging according to the invention.

The current passing through the battery 110 during step 404, which is constant at the fast charge level of 3.2 Amps, is illustrated by the time period 502 in FIG. 5. The voltage across the battery terminals 110a, 110b during step 404 is illustrated by the time period 602 in FIG. 6. Namely, battery voltage increases from the initial 1.95 Volts to 2.5 Volts.

When step 404 determines that the battery voltage has reached the target voltage, the computation module 152 in step 406 directs the converter 149 to begin applying a constant, fast charge voltage to the battery 110. In this example, a fast charge voltage of 2.5 Volts is utilized in step 406. In this example, the fast charge voltage is the same as the target voltage and therefore must be selected using the same criteria. Nonetheless, a suitable fast charge voltage may be obtained empirically or from the battery manufacturer's specifications, for example.

In step 408, the computation module 152 determines, via one or more of the sensors 156, whether the current passing through the battery 110 has decreased to a prescribed target charge current, referred to as $I_{min}$. The battery charge current is measured by opening the switch 108 to isolate the battery 110 from the load 112, measuring the voltage across the element 106 (via lines 104b, 104c), and dividing the element's impedance by its voltage drop. The level of the target charge current is selected with the purpose of indicating a known state of charge of the battery. This may be determined empirically or by the battery manufacturer's specifications. Care must be taken to ensure the target current is at least ten times greater than the typical float/trickle charge current in order to ensure the charger properly transitions from fast charge to over-charge mode (described below). As a safety precaution, a safety timer may be used to transition to the overcharge mode from fast charge if $I_{min}$ is not reached in a predetermined amount of time.

If the target charge current has not been reached, application of the fast charge voltage continues in step 410. When the target charge current is finally reached (or the optional safety timer expires), step 408 advances to step 412.

The current passing through the battery 110 during step 406, which decays from the fast charge current (3.2 Amps) to the target charge current, is illustrated by the time period 504 in FIG. 5. The voltage across the battery terminals 110*a*, 110*b* during step 404 is illustrated by the time period 604 in FIG. 6. Namely, battery voltage is constant at the fast charge voltage of 2.5 Volts.

Transitional Computations

In step 412, the computation module 152 notes the elapsed time indicated by the timer 154, which was started in step 402. This elapsed time is referred to as T1. Also in step 412, the computation module 152 proceeds to compute a proposed time for the next stage of battery charging. This time is called the proposed overcharge time, also referred to as T2, and is computed as shown below in Equation 1.

$$T2=T1*K*TC \quad [1]$$

where: T2=the proposed overcharge time.
T1=the elapsed time of completing steps 404,406,410 until a positive answer is received to query 408.
K=a constant multiplication factor.
TC=a temperature coefficient.

The present inventors have discovered that, with the multi-stage charging technique of this invention, it is effective to maintain the overcharge mode (described below) for a length of time that is a multiple of the elapsed time T1. This multiple is the constant multiplication factor K, which can be empirically determined for the particular make/model of battery being used. As for the temperature coefficient, this is not a constant value. Rather, this value changes inversely with battery temperature, thus having the effect of increasing charge times for colder temperatures. The temperature coefficient may be empirically determined for the particular make/model of battery being used. The multiplication factor and temperature coefficient together make up an adjustment factor.

In performing the overcharge time computation of step 412, the computation module 152 may refer to suitable storage registers, lookup tables, linked lists, or other data structures to obtain the values of K and TC.

After completing the calculation of step 412, the computation module 152 proceeds to compute an actual overcharge time, based on the proposed overcharge time of step 412. Generally, the actual overcharge time is equal to the proposed overcharge time. However, the actual overcharge time is limited to a prescribed maximum time, which is determined empirically or from the battery manufacturer's specifications.

Accordingly, the computation module 152 in step 414 determines whether the proposed overcharge time exceeds the prescribed maximum time (1.5 hours in this example). If so, step 418 sets the actual overcharge time equal to the prescribed maximum time (1.5 hours). Otherwise, step 416 adopts the proposed overcharge time, utilizing this value as the actual overcharge time.

Overcharge Mode

After step 416 or 418, step 420 commences the overcharge mode. Namely, the computation module 152 begins to apply the computed overcharge voltage to the battery 110. The overcharge voltage is a value that is determined empirically or from the battery manufacturer's specifications. Like the fast charge setting, the overcharge voltage setting is critical to ensure the battery is property overcharged. If too low, the battery will be undercharged and if too high the battery will receive too much overcharge, which will reduce the life of the battery. In the present example, the overcharge voltage comprises 2.65 Volts.

The current passing through the battery 110 during the overcharge mode (step 420), which decreases as the battery charges, is illustrated by the time period 506 in FIG. 5. The voltage across the battery terminals 110*a*, 110*b* during the overcharge mode (step 420) is illustrated by the time period 606 in FIG. 6. Namely, overcharge battery voltage is constant at 2.65 Volts.

During the overcharge mode, step 422 repeatedly checks whether the actual overcharge time has expired. If not, step 420 continues to apply the overcharge voltage to the battery 110. When the overcharge time expires, step 422 advances to step 424, discussed below.

Float Mode

After the overcharge time expires, the computation module 152 begins to apply a trickle charge voltage to the battery 110 (step 424). The trickle charge voltage, which is designed to preserve the battery's full charge indefinitely without overcharging or damaging the battery, may be determined empirically or from the battery manufacturer's specifications. In the present example, the trickle charge voltage is 2.32 Volts.

The current passing through the battery 110 during trickle charging (step 424) decreases gradually to a constant value, as shown by the time period 508 of FIG. 5. The voltage across the battery terminals 110*a*, 110*b* during step 424 is illustrated by the time period 608 in FIG. 6. Namely, the trickle charge battery voltage is constant at 2.32 Volts.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

We claim:

1. A battery charging method, comprising operations of:
    applying a constant current to the battery at a first time;
    determining when battery voltage has risen to a target voltage, and substantially thereupon applying a fast charge voltage to the battery;
    determining a second time when battery charge current has decreased to a target charge current;
    substantially at the second time, determining an elapsed time between the first and second times;
    computing a proposed overcharge time comprising a multiplicative product of the elapsed time and an adjustment factor;
    computing an actual overcharge time comprising the proposed overcharge time, limited to a prescribed maximum time; and
    applying an overcharge voltage to the battery for a length of time substantially equal to the actual overcharge time.

2. The method of claim 1, where the operation of computing the proposed overcharge time comprises:
multiplying the elapsed time by an adjustment factor that includes a temperature coefficient of increasing values for colder battery temperatures and decreasing values for warmer battery temperatures.

3. The method of claim 1, where the target voltage is substantially equal to the fast charge voltage.

4. The method of claim 1, where the overcharge voltage exceeds the fast charge voltage.

5. The method of claim 1, where:
the battery is removably attached to an electrical load;
the operations further include detaching the battery from the load during the operation of determining the second time.

6. The method of claim 1, the operations further comprising:
limiting the second time to a predetermined maximum safety time.

7. The method of claim 1, the operations further comprising:
after applying the overcharge voltage to the battery for the length of time substantially equal to the actual overcharge time, applying a trickle charge voltage to the battery.

8. The method of claim 7 where the target charge current is at least ten times greater than battery current during application of the trickle charge voltage.

9. The method of claim 7, where the fast charge voltage exceeds the trickle voltage.

10. A battery charging method, comprising operations of:
applying a first prescribed current to a battery until battery voltage increases to a first prescribed voltage;
applying a second prescribed voltage to the battery until current passing through he battery decreases to a second prescribed current;
applying a third prescribed voltage to the battery for a calculated length of time substantially equal to:
an adjustment factor multiplied by added times of the application of the first described current and second prescribed voltage to the battery;
wherein, in any event, said calculated length of time is limited to a predetermined maximum time.

11. The method of claim 10, the first and second voltage being substantially equal.

12. The method of claim 10, further comprising :
applying a fourth prescribed voltage to the battery upon the expiration of the calculated length of time.

13. A signal-bearing medium tangibly embodying a program of machine-readable instructions executable by a digital processing apparatus to perform a method for charging a battery, said method comprising operations of:
applying a constant current to the battery at a first time;
determining when battery voltage has risen to a target voltage, and substantially thereupon applying a fast charge voltage to the battery;
determining a second time when battery charge current has decreased to a target charge current;
substantially at the second time, determining an elapsed time between the first and second times;
computing a proposed overcharge time comprising a multiplicative product of the elapsed time and an adjustment factor;
computing an actual overcharge time comprising the proposed overcharge time limited to a prescribed maximum time; and
applying an overcharge voltage to the battery for a length of time substantially equal to the actual overcharge time.

14. A signal-bearing medium tangibly embodying a program of machine-readable instructions executable by a digital processing apparatus to perform a method for charging a battery, said method comprising operations of:
applying a first prescribed current to a battery until battery voltage increases to a first prescribed voltage;
applying a second prescribed voltage to the battery until current passing through the battery decreases to a second prescribed current;
applying a third prescribed voltage to the battery for a calculated length of time substantially equal to:
an adjustment factor multiplied by added times of the application of the first prescribed current and second prescribed voltage to the battery;
wherein, in any event, said calculated length of time is limited to a predetermined maximum time.

15. A logic circuit of multiple interconnected electrically conductive elements configured to perform operations to charge a battery, the operations comprising:
battery charging method, comprising operations of:
applying a constant current to the battery at a first time;
determining when battery voltage has risen to a target voltage, and substantially thereupon applying a fast charge voltage to the battery;
determining a second time when battery charge current has decreased to a target charge current;
substantially at the second time, determining an elapsed time between the first and second times;
computing a proposed overcharge time comprising a multiplicative product of the elapsed time and an adjustment factor;
computing an actual overcharge time comprising the proposed overcharge time, limited to a prescribed maximum time; and
applying an overcharge voltage to the battery for a length of time substantially equal to the actual overcharge time.

16. A logic circuit of multiple interconnected electrically conductive elements configured to perform operations to charge a battery, the operations comprising:
applying a first prescribed current to a battery until battery voltage increases to a first prescribed voltage;
applying a second prescribed voltage to the battery until current passing through the battery decreases to a second prescribed current;
applying a third prescribed voltage to the battery for a calculated length of time substantially equal to:
an adjustment factor multiplied by added times of the application of the first prescribed current and second prescribed voltage to the battery;
wherein, in any event, said calculated length of time is limited to a predetermined maximum time.

17. A battery charger system, comprising:
a charger circuit;
coupled to the charger circuit,
a power source node;
a second node;
a third node;
the charger circuit being programmed to charge a battery attached between the second and third nodes by:
applying a constant current to the battery at a first time;
determining when battery voltage has risen to a target voltage, and substantially thereupon applying a fast charge voltage to the battery;

determining a second time when battery charge current has decreased to a target charge current;

substantially at the second time, determining an elapsed time between the first and second times;

computing a proposed overcharge time comprising a multiplicative product of the elapsed time and an adjustment factor;

computing an actual overcharge time comprising the proposed overcharge time, limited to a prescribed maximum time; and applying the overcharge voltage to the battery for a length of time substantially equal to the actual overcharge time.

18. The apparatus of claim 17, further comprising:

electrical coupling to place an electrical load in parallel with the battery;

the coupling including a switch to selectively decouple the battery from the load.

19. The apparatus of claim 17, further comprising:

electrical coupling to place an electrical load in parallel with the battery;

the coupling including a switch to selectively decouple the battery from the load, the switch being remotely operated by the charger circuit;

the charger circuit being further programmed to detach the battery from the load during the operation of determining the second time.

20. A battery charger system, comprising:

a charger circuit;

coupled to the charger circuit, a power source node;

a second node for connection to a positive battery terminal;

a third node for connection to a negative battery terminal;

the charger circuit being programmed to charge a battery attached between the second and third nodes by:
 applying a first prescribed current to a battery until battery voltage increases to a first prescribed voltage;
 applying a second prescribed voltage to the battery until current passing through the battery decreases to a second prescribed current;
 applying a third prescribed voltage to the battery for a calculated length of time substantially equal to:
 an adjustment factor multiplied by added times of the application of the first prescribed current and second prescribed voltage to the battery;
 wherein, in any event, said calculated length of time is limited to a predetermined maximum time.

21. A battery charger system, comprising:

a power source node;

a second node for connection to a positive battery terminal;

a third node for connection to a negative battery terminal;

charger means coupled to the power, second, and third nodes, for charging a battery attached between the second and third nodes by:
 applying a constant current to the battery at a first time;
 determining when battery voltage has risen to a target voltage, and substantially thereupon applying a fast charge voltage to the battery;
 determining a second time when battery charge current has decreased to a target charge current;
 substantially at the second time, determining an elapsed time between the first and third times;
 computing a proposed overcharge time comprising a multiplicative product of the elapsed time and an adjustment factor;
 computing an actual overcharge time comprising the proposed overcharge time, limited to a prescribed maximum time; and
 applying the overcharge voltage to the battery for a length of time substantially equal to the actual overcharge time.

22. A battery charger system, comprising:

a power source node;

a second node for connection to a positive battery terminal;

a third node for connection to a negative battery terminal;

charging means coupled to the power, second, and third nodes for charging a battery attached between the second and third nodes by:
 applying a first prescribed current to a battery until battery voltage increases to a first prescribed voltage;
 applying a second prescribed voltage to the battery until current passing through the battery decreases to a second prescribed current;
 applying a third prescribed voltage to the battery for a calculated length of time substantially equal to:
 an adjustment factor multiplied by added times of the application of the first prescribed current and second prescribed voltage to the battery;
 wherein, in any event, said calculated length of time is limited to a predetermined maximum time.

* * * * *